(12) United States Patent
Aoyanagi

(10) Patent No.: US 7,965,634 B2
(45) Date of Patent: Jun. 21, 2011

(54) TRANSMISSION RATE ADJUSTMENT DEVICE AND METHOD

(75) Inventor: Hisakazu Aoyanagi, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 1027 days.

(21) Appl. No.: 11/593,610

(22) Filed: Nov. 7, 2006

(65) Prior Publication Data
US 2007/0189315 A1    Aug. 16, 2007

(30) Foreign Application Priority Data

Feb. 15, 2006  (JP) ................................. 2006-037927

(51) Int. Cl.
| | | |
|---|---|---|
| H04L 7/00 | (2006.01) | |
| H04L 25/00 | (2006.01) | |
| H04L 25/40 | (2006.01) | |
| H04L 1/00 | (2006.01) | |
| H04L 12/26 | (2006.01) | |
| H03D 3/24 | (2006.01) | |
| G01R 31/08 | (2006.01) | |
| G06F 11/00 | (2006.01) | |
| G08C 15/00 | (2006.01) | |
| H04J 1/16 | (2006.01) | |
| H04J 3/14 | (2006.01) | |

(52) U.S. Cl. ..... 370/235; 370/229; 370/230; 370/230.1; 375/371; 375/372; 375/376

(58) Field of Classification Search .................. 370/235, 370/229, 230, 230.1; 386/46; 375/371, 372, 375/376
See application file for complete search history.

(56) References Cited

U.S. PATENT DOCUMENTS

| | | | | |
|---|---|---|---|---|
| 5,828,414 | A * | 10/1998 | Perkins et al. | 375/240.01 |
| 5,905,732 | A * | 5/1999 | Fimoff et al. | 370/516 |
| 6,169,843 | B1 | 1/2001 | Leniban et al. | |
| 6,219,396 | B1 * | 4/2001 | Owada | 375/372 |
| 6,728,716 | B1 * | 4/2004 | Bhattacharya et al. | 707/10 |

(Continued)

FOREIGN PATENT DOCUMENTS

EP        1 562 381 A1    9/2004

(Continued)

OTHER PUBLICATIONS

Chinese Office Action dated Apr. 24, 2009 with an English-Language translation.

Primary Examiner — Ayaz R Sheikh
Assistant Examiner — Tarell Hampton
(74) Attorney, Agent, or Firm — McGinn IP Law Group, PLLC

(57) ABSTRACT

A transmission rate adjustment device for supplying MPEG-TS at a desired transmission rate includes: a buffer; a buffer write unit for both sequentially writing to the buffer transport packets of the transport stream that have been read from an MPEG2-TS file and detecting time stamps in the transport stream; and a buffer read unit for transmitting to the MPEG decoder transport packets that have been sequentially read from the buffer at a transmission rate determined by a clock obtained by frequency-dividing a system clock of the MPEG decoder by a frequency division rate designated by a frequency division rate signal. The buffer read unit not only inserts NULL packets between transport packets, but also rewrites time stamps when adjustment cannot be realized by merely inserting the NULL packets.

13 Claims, 13 Drawing Sheets

U.S. PATENT DOCUMENTS

| | | | |
|---|---|---|---|
| 2002/0051063 A1* | 5/2002 | Hwang | 348/231 |
| 2004/0008736 A1* | 1/2004 | Bae et al. | 370/528 |
| 2004/0013093 A1* | 1/2004 | Eder et al. | 370/302 |
| 2004/0114817 A1* | 6/2004 | Jayant et al. | 382/239 |
| 2004/0213298 A1* | 10/2004 | Sato | 370/537 |
| 2005/0036763 A1* | 2/2005 | Kato et al. | 386/69 |
| 2005/0117583 A1* | 6/2005 | Uchida et al. | 370/395.4 |
| 2005/0147033 A1* | 7/2005 | Chin et al. | 370/229 |
| 2005/0166032 A1* | 7/2005 | Noeske et al. | 711/217 |
| 2005/0169181 A1* | 8/2005 | Kim et al. | 370/235 |
| 2005/0249300 A1* | 11/2005 | Jeong et al. | 375/265 |
| 2006/0007960 A1* | 1/2006 | Liu et al. | 370/503 |
| 2006/0133398 A1* | 6/2006 | Choi et al. | 370/412 |
| 2007/0036212 A1* | 2/2007 | Leung et al. | 375/238 |
| 2007/0092224 A1* | 4/2007 | Tsukagoshi et al. | 386/96 |

FOREIGN PATENT DOCUMENTS

| | | |
|---|---|---|
| JP | 11-177516 | 7/1999 |
| JP | 11-205789 | 7/1999 |
| JP | 11-298893 | 10/1999 |
| JP | 11-341056 | 10/1999 |
| JP | 2000-236526 | 8/2000 |
| JP | 2001-339688 | 12/2001 |
| JP | 2002-118824 | 4/2002 |
| JP | 2003-051963 | 2/2003 |

* cited by examiner

Fig. 8

| Frequency division rate | Transmission rate (Mbps) |
|---|---|
| 1 | 216 |
| 2 | 108 |
| 4 | 54 |
| 8 | 27 |
| 16 | 13.5 |
| 32 | 6.75 |

| TS | NULL | Total of TS | Total of NULL | Average insertion spacing |
|---|---|---|---|---|
| 2 | 1 | 2 | 1 | 2.000 |
| 1 | 1 | 3 | 2 | 1.500 |
| 1 | 1 | 4 | 3 | 1.333 |
| 2 | 1 | 6 | 4 | 1.500 |
| 1 | 1 | 7 | 5 | 1.400 |
| 2 | 1 | 9 | 6 | 1.500 |
| 1 | | 10 | 7 | 1.429 |

Fig. 10

| TS | NULL | Total of TS | Total of NULL | Average insertion spacing |
|---|---|---|---|---|
| 2 | 1 | 2 | 1 | 2 |
| 1 | 1 | 3 | 2 | 1.5 |
| 1 | 1 | 4 | 3 | 1.333 |
| 1 | 1 | 5 | 4 | 1.25 |
| 2 | 1 | 7 | 5 | 1.4 |
| 1 | 1 | 8 | 6 | 1.333 |
| 1 | 1 | 9 | 7 | 1.286 |
| 1 | 1 | 10 | 8 | 1.25 |

Fig. 11

|  | Input | Input+Preceding remains | Output | Buffer data amount |
|---|---|---|---|---|
|  |  | 0.0 |  |  |
| TS packet | 188.0 | 188.0 | 125.3 | 62.7 |
| TS packet | 188.0 | 250.7 | 125.3 | 125.3 |
| NULL packet | 0.0 | 125.3 | 125.3 | 0.0 |
| TS packet | 188.0 | 188.0 | 125.3 | 62.7 |
| NULL packet | 0.0 | 62.7 | 125.3 | 0.0 |
| TS packet | 188.0 | 188.0 | 125.3 | 62.7 |
| NULL packet | 0.0 | 62.7 | 125.3 | 0.0 |
| TS packet | 188.0 | 188.0 | 125.3 | 62.7 |
| NULL packet | 0.0 | 62.7 | 125.3 | 0.0 |
| TS packet | 188.0 | 188.0 | 125.3 | 62.7 |
| TS packet | 188.0 | 250.7 | 125.3 | 125.3 |
| NULL packet | 0.0 | 125.3 | 125.3 | 0.0 |
| TS packet | 188.0 | 188.0 | 125.3 | 62.7 |
| NULL packet | 0.0 | 62.7 | 125.3 | 0.0 |
| TS packet | 188.0 | 188.0 | 125.3 | 62.7 |
| NULL packet | 0.0 | 62.7 | 125.3 | 0.0 |
| TS packet | 188.0 | 188.0 | 125.3 | 62.7 |
| NULL packet | 0.0 | 62.7 | 125.3 | 0.0 |

Fig. 12

TRANSMISSION RATE ADJUSTMENT DEVICE AND METHOD

This application is based upon and claims the benefit of priority from Japanese Patent Application No. 2006-37927, filed in the Japanese Patent Office on Feb. 15, 2006, the contents of which are hereby incorporated by reference.

BACKGROUND OF THE INVENTION (1) Field of the Invention

The present invention relates to a method and device for adjusting the transmission rate of a transport stream, and more particularly to a method and device for adjusting the transmission rate of a transport stream (MPEG-TS) that has been compression encoded in accordance with the MPEG (Moving Picture Experts Group) standard.

(2) Description of the Related Art

In recent years, devices have come into popular use for playing back MPEG files stored on a recording medium, such as a memory card. In this type of playback device, an MPEG decoder is used to serve as an interface for MPEG files in MPEG2-TS. Typically, data of various transmission rates are stored as MPEG files on a recording medium, and the MPEG2-TS that is read from the MPEG file has various transmission rates. As a result, the transmission rate of MPEG2-TS that is read from MPEG files sometimes differs from the transmission rate that is appropriate for the MPEG decoder. In such cases, the MPEG2-TS read from MPEG files must be converted to the transmission rate appropriate to the MPEG decoder.

Methods for supplying MPEG2-TS that has been read from an MPEG file at the transmission rate appropriate to an MPEG decoder include a method in which a PCR (Program Clock Reference), which is a program time standard reference value inscribed in TS packets, is used to reproduce a clock by a PLL circuit, and then transmits MPEG2-TS matched to the reproduced clock to a MPEG decoder.

In addition to the above-described method, JP-A-2001-339688 (hereinbelow referred to as Patent Document 1) discloses a playback device, the configuration and operation of which are described in greater detail below.

MPEG-TS enables the multiplexing of a plurality of programs such as video signals, audio signals, and data in a single stream. FIG. 1 shows the packet configuration of MPEG-TS.

MPEG-TS is made up from an assemblage of a plurality of transport packets (hereinbelow referred to as simply "TS packets") having a packet length of 188 bytes as shown in (A) of FIG. 1. Each TS packet is composed of header 51 and payload 52, as shown in (B) of FIG. 1. Header 51 is composed of a transport header of 32 bits and adaptation field 54, as shown in (C) of FIG. 1. The transport header includes PID (Packet Identification) 53 of 13 bits, which is packet identification information. As shown in (D) of FIG. 1, adaptation field 54 includes PCR 55 of 48 bits, which is the program time standard reference value. PCR 55 is a time stamp of 27 MHz. This PCR 55 is consulted to reproduce the standard time during encoding by the STC (System Time Clock) of the MPEG decoder.

As shown in (E) of FIG. 1, PCR 55 is described by a total of 48 bits: extension portion 60 of 9 bits that repeats 300 counts, base portion 58 of 33 bits that counts one for the 300 counts of extension portion 60, and reserved region 59 of 6 bits. FIG. 2 shows the configuration of the transport stream playback device described in patent document 1. Referring to FIG. 2, the transport stream playback device is composed of: playback processor 102, memory 103, PCR detector 104, timing controller 105, PCR operation unit 106, NULL packet generation unit 107, and selector 108.

MPEG-TS is recorded on recording medium 100 at a recording rate different from the transmission rate of 27 Mbps. Playback processor 102 plays back the MPEG-TS from recording medium 100 and transfers this reproduced MPEG-TS to memory 103 and PCR detector 104. PCR detector 104 detects the PCR in the reproduced MPEG-TS and transmits the PCR detection signal to timing controller 105 for each detection of this PCR.

NULL packet generation unit 107 generates NULL packets, which are dummy TS packets. The packet length of these NULL packets is also 188 bytes, identical to that of the TS packets. MPEG-TS that has been read from memory 103 is supplied to one of the inputs of selector 108, and NULL packets generated in NULL packet generation unit 107 are supplied to the other input of selector 108. Selector 108 selects and supplies as output one of these inputs. PCR operation unit 106 calculates the value of the next PCR such that the proper PCR spacing is realized when the spacing of the current PCR and the next PCR exceeds the proper PCR spacing due to the insertion of NULL packets.

Timing controller 105 both monitors the detected PCR value of input PCR detection signals and supplies from selector 108 the playback MPEG-TS that has been read from memory 103 matched to 27 MHz clock. Timing controller 105 calculates the difference value between the current PCR and the next PCR, and based on the result of this calculation, determines how many bits of data can be transmitted at 27 MHz clock in the interval between the current PCR and the next PCR when supplying, at a transmission rate of 27 Mbps, MPEG-TS that has been read from memory 103. When a contradiction occurs in the PCR spacing during supply of the MPEG-TS packet that contains the next PCR, timing controller 105 does not read the MPEG-TS packet that contains the next PCR from memory 103, but rather, inserts a NULL packet generated in NULL packet generation unit 107 in its place. If the spacing between the current PCR and the next PCR exceeds the proper PCR spacing when timing controller 105 is to insert yet another NULL packet and then supply the MPEG-TS packet that contains the next PCR, timing controller 105 reads the TS packet that contains the next PCR from memory 103 without inserting the NULL packet. At this time, timing controller 105 rewrites the value of the next PCR that has been inscribed in the TS packet that has been read to a PCR value that has been calculated in PCR operation unit 106 to match the output timing. In this way, output MPEG-TS can be obtained that lacks mismatching between PCR.

However, the above-described playback method and playback device have the problems described below.

In the method in which PCR is used to reproduce a clock in a PLL circuit and MPEG2-TS is transmitted to an MPEG decoder matched to the reproduced clock, a clock reproduction circuit is required that uses a PLL circuit, and this method therefore has the drawbacks of increased circuit scale and high costs. In addition, when reproducing, in an MPEG decoder, data that have undergone software conversion from MPEG2-PS (Program Stream) to MPEG2-TS, the transmission rate that is calculated based on the number of bytes between the PCR of MPEG2-TS is sometimes not uniform, and as a result, clock reproduction that uses the above-described PLL circuit is problematic.

The reproduction device described in Patent Document 1 is a device that reproduces and supplies recording data (MPEG files) in which the transmission rate is 25 Mbps as MPEG-TS in which the transmission rate is 27 Mbps, and that uses a clock in which the frequency is 27 MHz to supply this reproduction MPEG-TS. The clock of 27 MHz for this output must match with the clock that is calculated from the PCR. As a result, the reproduction device described in Patent Document 1 also necessitates a clock reproduction circuit that uses a PLL circuit and thus entails the same drawbacks as described above.

SUMMARY OF THE INVENTION

It is an object of the present invention to provide a transmission rate adjustment device that can supply MPEG-TS at a desired transmission rate without using a PLL circuit and thus provide a solution to the above-described problems.

To achieve the above-described object, the present invention relates to a transmission rate adjustment device for adjusting the transmission rate of an input transport stream, the transmission rate adjustment device taking as input a transport stream that is composed of a plurality of transport packets having fixed packet length in which encoded data are stored, and in which time stamps (PCR) of a prescribed frequency that is the standard time interval during the above-described encoding are inscribed at fixed time intervals; the transmission rate adjustment device including:

a buffer;

a buffer write unit that both successively writes transport packets of the input transport stream to the buffer and detects time stamps in the input transport stream; and a buffer read unit that takes as input both a frequency division rate signal that designates a frequency division rate and a system clock of a decoder for decoding the encoded data, and that transmits to the decoder the transport packets that have been sequentially read from the buffer at a transmission rate determined by a clock obtained by frequency-dividing the input system clock by the frequency division rate designated by the input frequency division rate signal;

wherein the buffer write unit, upon detecting the time stamps, stores in the buffer: the difference between a first time stamp that has been detected this time and a second time stamp that was previously detected, the number of transport packets that exist in the interval between the first and second time stamps, and the value of the second time stamp, as appended information of the transport packet to which the second time stamp is inscribed; and the buffer read unit, upon reading from the buffer a transport packet to which the second time stamp has been inscribed, based on the appended information that has been attached to the transport packet, inserts NULL packets between transport packets that have been read from the buffer to achieve adjustment such that the transport packets are transmitted at the transmission rate, and when adjustment cannot be achieved by the mere insertion of NULL packets, when reading from the buffer the transport packet in which the first time stamp has been inscribed, rewrites the time stamp of the transport packet.

According to the above-described configuration, a clock obtained by frequency-dividing the system clock of a decoder (MPEG decoder) is used as a clock for interfacing with the decoder, whereby the need to reproduce a clock by means of, for example, a PLL circuit, can be eliminated.

In addition, not only are NULL packets inserted between transport packets, but time stamps (PCR) are rewritten such that the transmission rate of the transport packets that are sequentially read from the buffer matches the transmission rate of the interface that is determined by the interface clock, and as a result, in a case in which data that have undergone software conversion from MPEG2-PS (Program Stream) to MPEG2-TS are to be reproduced by a MPEG decoder, even when the transmission rate calculated based on the number of bytes between the PCR of MPEG2-TS is not uniform, the transmission rate is adjusted to match the transmission rate of the interface that is determined by interface clock. The MPEG2-TS can therefore be transmitted to the MPEG decoder at the correct transmission rate without the occurrence of problems in clock reproduction on the decoder side.

As described in the foregoing explanation, by eliminating the need to use a clock reproduction circuit that includes a PLL circuit, the present invention enables a corresponding decrease of costs and reduction of circuit scale.

In addition, even when transmission rate calculated from the number of bytes between PCR of MPEG2-TS is not uniform, MPEG2-TS can be transmitted to the MPEG decoder at the correct transmission rate, whereby a more stable decoding operation can be provided for the decoder than a device of the prior art.

The above and other purposes, features, and advantages of the present invention will become apparent from the following description with reference to the accompanying drawings which illustrate examples of the present invention.

BRIEF DESCRIPTION OF THE DRAWINGS

In the accompanying drawings:

FIG. 8 shows the relation between frequency division rate and transmission rate;

FIG. 10 is a view for explaining the example of insertion of NULL packets in the transmission rate adjustment device shown in FIG. 3;

FIG. 11 is a view for explaining another example of insertion of NULL packets in the transmission rate adjustment device shown in FIG. 3;

FIG. 12 is a view for explaining the changes in the data values that are stored in a transport buffer in the case of uniform insertion of NULL packets.

DETAILED DESCRIPTION OF THE PREFERRED EMBODIMENTS

Figure 3:
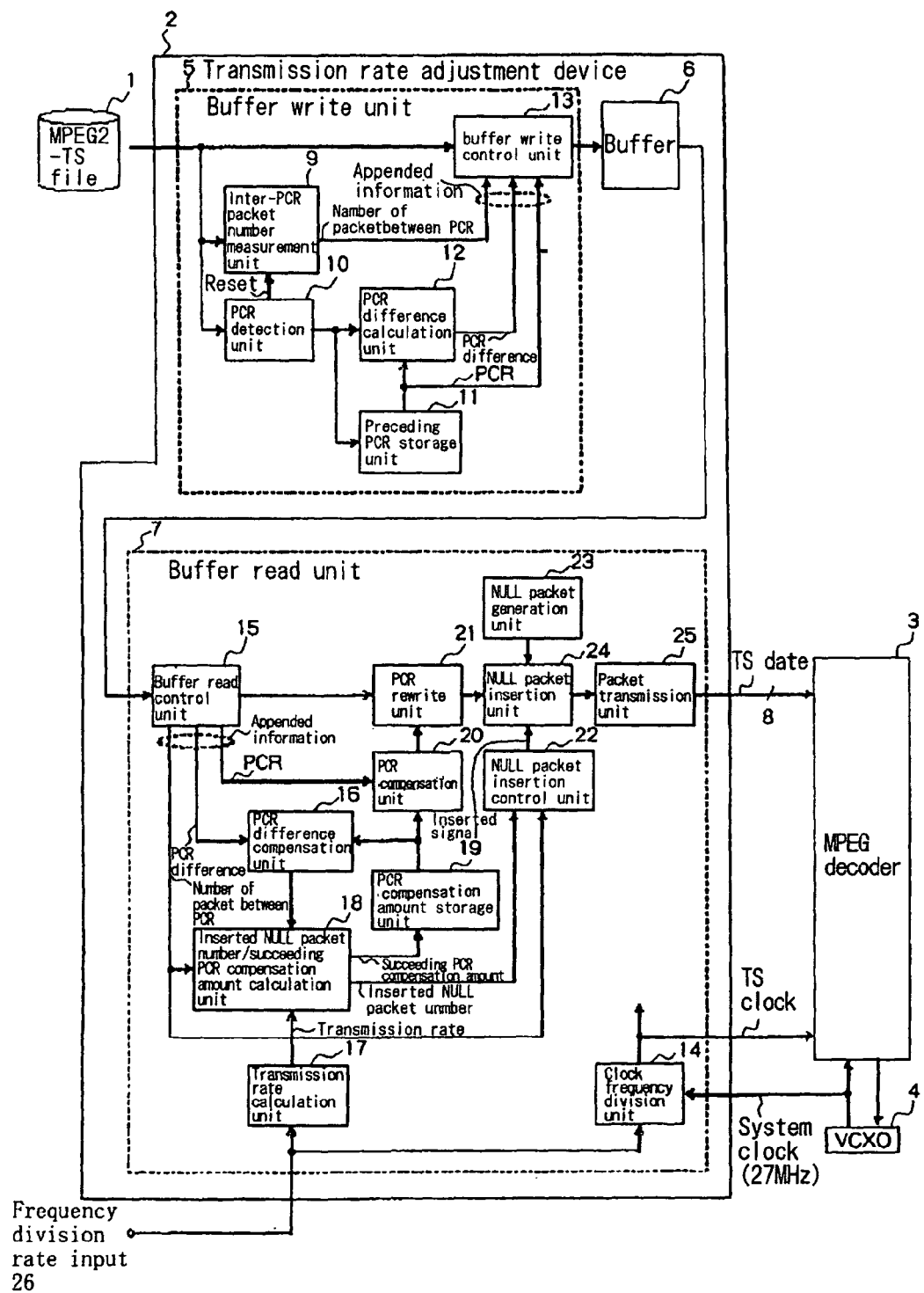
FIG. 3 is a block diagram showing the schematic configuration of the transmission rate adjustment device that is an embodiment of the present invention.

FIG. 3 is a block diagram showing the schematic configuration of a transmission rate adjustment device that is an embodiment of the present invention. Transmission rate adjustment device 2 shown in FIG. 3 is a device for adjusting the transmission rate of MPEG2-TS that has been read from MPEG2-TS file 1 and is composed of buffer write unit 5, buffer 6, and buffer read unit 7.

Figure 1:
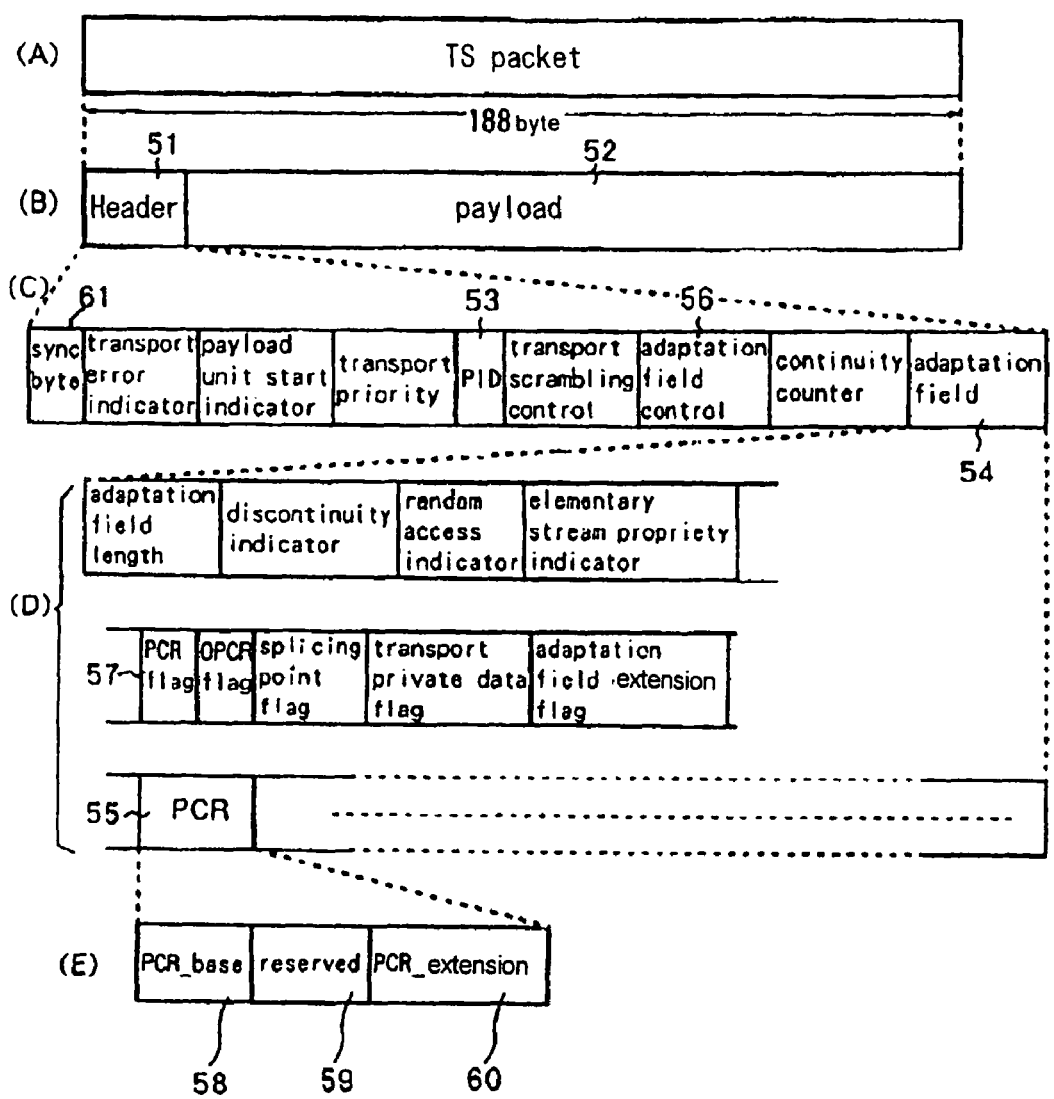
FIG. 1 shows the typical configuration of an MPEG-TS transport packet.
Figure 2:
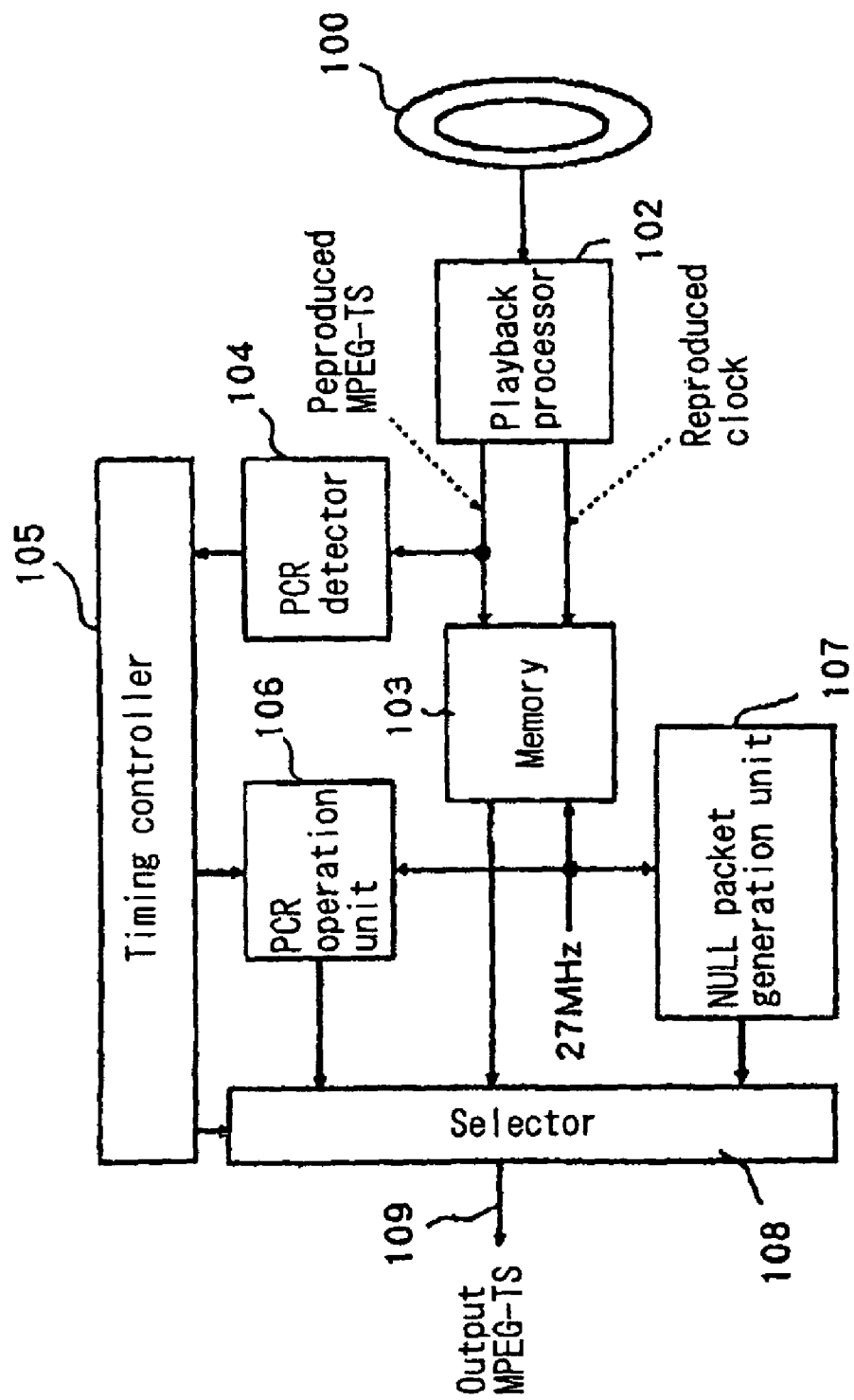
FIG. 2 is a block diagram showing the configuration of the transport stream reproduction device described in JP-A-2001-339688.

MPEG2-TS is stored in MPEG2-TS file I at the transmission rate that is used in the device on the data transmission side (not shown). MPEG2-TS that is stored in MPEG2-TS file 1 may be data that have undergone software conversion from MPEG2-PS to MPEG2-TS. MPEG2-TS is a collection of a plurality of TS packets of the configuration shown in FIG. 1. PCR, which are 27 MHz time stamps, are inscribed in the adaptation field of the TS packets. PCR are used for reproducing the standard time that was used during encoding in the device on the data transmission side by the STC (System Time Clock) of MPEG decoder 3. Based on these PCR, the predicted time of arrival in MPEG decoder 3 of packets in which the PCR have been inscribed can be learned.

Eight bits of TS packet data and TS packet clock serve as an interface between transmission rate adjustment device 2 and MPEG decoder 3. MPEG decoder 3 both uses PCR that are inscribed in the adaptation field in MPEG2-TS supplied from transmission rate adjustment device 2 to reproduce a system clock in a PLL circuit that includes VCXO 4 and supplies the reproduced system clock to transmission rate adjustment device 2. The system clock that is reproduced by this PLL circuit match the system clock of the device on the data transmission side.

Buffer write unit 5 shown in FIG. 3 is made up from: inter-PCR packet number measurement unit 9, PCR detection unit 10, preceding PCR storage unit 11, PCR difference calculation unit 12, and buffer write control unit 13. MPEG2-TS that is read from MPEG2-TS file 1 is supplied to each of inter-PCR packet number measurement unit 9, PCR detection unit 10, and buffer write control unit 13.

PCR detection unit 10 checks whether or not a PCR is inscribed in the adaptation field for each of the TS packets that are supplied as MPEG2-TS. When a PCR is inscribed, PCR detection unit 10 acquires the value of the PCR.

Inter-PCR packet number measurement unit 9 measures, as the inter-PCR packet number, the number of packets from the packet in which a PCR is inscribed until the packet preceding the packet in which the next PCR is inscribed. Inter-PCR packet number measurement unit 9 resets the current measurement value to "0" when the next PCR is detected by PCR detection unit 10.

Preceding PCR storage unit 11 holds the value of the PCR that has been acquired by PCR detection unit 10 until the next PCR is detected. PCR difference calculation unit 12 calculates the difference between the PCR value that has been acquired by PCR detection unit 10 and the PCR value of the preceding PCR that has been acquired by PCR detection unit 10 and stored in preceding PCR storage unit 11. The inter-PCR packet number that has been measured in inter-PCR packet number measurement unit 9, the PCR difference that has been calculated in PCR difference calculation unit 12, and the preceding PCR value that is stored in preceding PCR storage unit 11 are each supplied to buffer write control unit 13 as appended information.

Buffer write control unit 13 writes MPEG2-TS that has been read from MPEG2-TS file 1 to buffer 6 in units of TS packets. When writing a packet in which a PCR is inscribed to buffer 6, buffer write control unit 13 writes to buffer 6 the PCR that is stored in preceding PCR storage unit 11, the number of packets between PCR that has been measured in inter-PCR packet number measurement unit 9, and the PCR difference that has been calculated in PCR difference calculation unit 12 as the appended information of the packet in which the preceding PCR has been inscribed.

Figure 4:
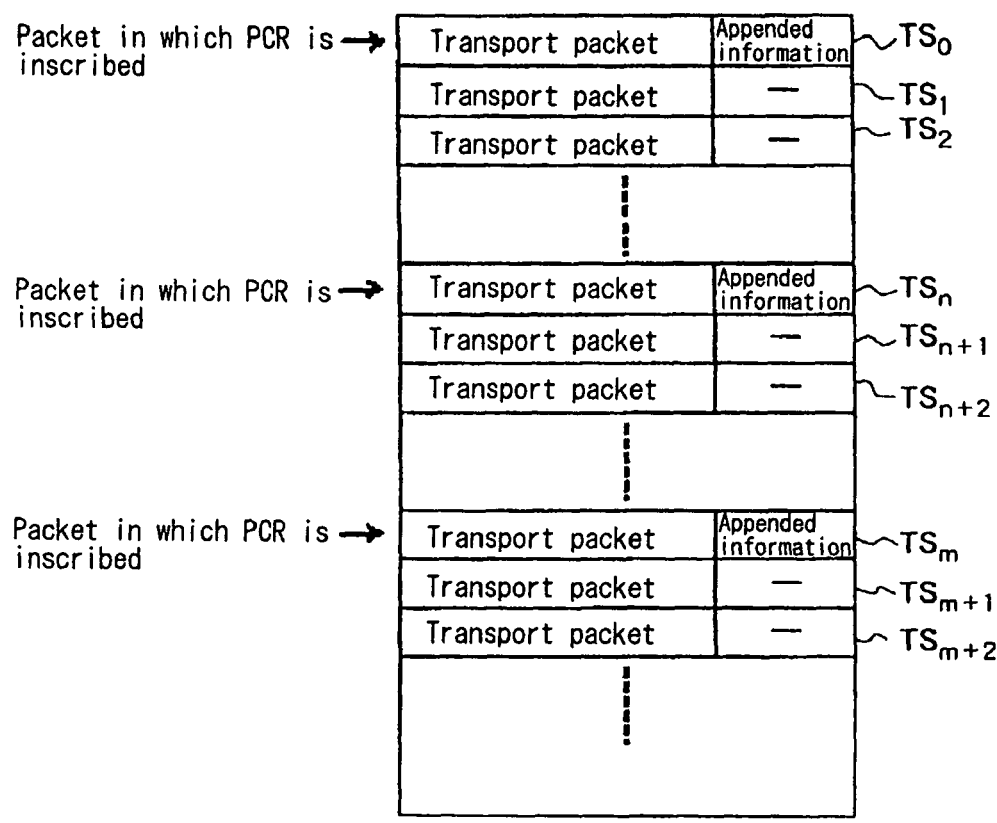
FIG. 4 is a view for explaining the transport packets and appended information that are stored in the buffer shown in FIG. 3.

FIG. 4 gives a schematic representation of the packets and the appended information that are stored in buffer 6. In this example, TS packets $T_0, T_1, T_2, \ldots T_n, T_{n+1}, T_{n+2}, \ldots, T_m, T_{m+2}, \ldots$ are stored in buffer 6 in that order. TS packets $T_0, T_n,$ and $T_m$ are TS packets in which PCR have been inscribed, and appended information is attached to each of these TS packets. The appended information of TS packet $T_0$ includes: the number of packets between the PCR of TS packets $T_0$ and $T_n$ that has been measured in inter-PCR packet number measurement unit 9, the PCR difference of TS packets $T_0$ and $T_n$ that has been calculated in PCR difference calculation unit 12, and the PCR value of TS packet $T_0$ that is stored in preceding PCR storage unit 11. In this way, the appended information that is acquired at the time of supply of the packet in which the next PCR is inscribed is stored together with the packets in which PCR has been inscribed.

Buffer read unit 7 shown in FIG. 3 is a device for reading TS packets from buffer 6 and includes: clock frequency division unit 14, buffer read control unit 15, PCR difference compensation unit 16, transmission rate calculation unit 17, inserted NULL packet number/succeeding PCR compensation amount calculation unit 18, PCR compensation amount storage unit 19, PCR compensation unit 20, PCR rewrite unit 21, NULL packet insertion control unit 22, NULL packet generation unit 23, NULL packet insertion unit 24, and packet transmission unit 25.

Clock frequency division unit 14 and transmission rate calculation unit 17 are supplied with frequency division rate input signal 26. Clock frequency division unit 14 frequency-divides the 27 MHz system clock of MPEG decoder 3 that is supplied as output from VCXO 4 by the frequency division rate that is determined by frequency division rate input signal 26 and supplies the frequency-divided clock as the interface clock (TS clock) of the transport stream to MPEG decoder 3.

Buffer read control unit 15 reads TS packets sequentially from buffer 6 and supplies the TS packets to PCR rewrite unit 21. Buffer read control unit 15 reads appended information (PCR value, number of packets between PCR, and the PCR difference) for TS packets in which PCR have been inscribed together with the TS packets. Of the appended information that has been read, the PCR difference is supplied to PCR difference compensation unit 16, the number of packets between PCR is supplied to inserted NULL packet number/succeeding PCR compensation amount calculation unit 18, and the PCR value is supplied to PCR compensation unit 20.

PCR difference compensation unit 16 compensates the PCR difference that is supplied from buffer read control unit 15 with the PCR compensation amount that is stored in PCR compensation amount storage unit 19. Transmission rate calculation unit 17 calculates the transmission rate to MPEG decoder 3 from the frequency division rate that is determined by frequency division rate input signal 26. For example, when the frequency division rate is 4, the TS clock is 6.75 MHz, or ¼ the frequency of 27 MHz. The TS data, which are the output of packet transmission unit 25, are of 8 bits, and the transmission rate to MPEG decoder 3 is therefore calculated as 54 Mbps (=6.75 MHz×8 bits).

Based on the number of packets between PCR that has been supplied from buffer read control unit 15, the PCR difference that has been compensated by PCR difference compensation unit 16, and the transmission rate that has been calculated by transmission rate calculation unit 17, inserted NULL packet number/succeeding PCR compensation amount calculation unit 18 both calculates the number of NULL packets that should be inserted to cause the transmission rate of the transport stream that has been read from buffer 6 to match the transmission rate that has been calculated by transmission rate calculation unit 17 and calculates the succeeding PCR compensation amount for compensating the PCR value of the packet in which the succeeding PCR is inscribed to compensate the fraction for which adjustment cannot be achieved by merely inserting NULL packets.

PCR compensation amount storage unit 19 stores the succeeding PCR compensation amount that has been calculated by inserted NULL packet number/succeeding PCR compensation amount calculation unit 18. PCR compensation unit 20 compensates the PCR that is supplied from buffer read control unit 15 by the PCR compensation amount that is stored in PCR compensation amount storage unit 19. For packets in which PCR are inscribed and that have been supplied from buffer read control unit 15, PCR rewrite unit 21 rewrites the PCR that are inscribed in these packets to the PCR that have been compensated by PCR compensation unit 20.

NULL packet insertion control unit 22, based on the number of inserted NULL packets that has been calculated by inserted NULL packet number/succeeding PCR compensation amount calculation unit 18 and the number of packets between PCR that has been read by buffer read control unit 15, determines the spacing of the insertion of NULL packets and the number of insertions and supplies as output an insertion signal that indicates the timings of the NULL packets that are to be inserted.

NULL packet generation unit 23 generates NULL packets for insertion into transport packets that have been read by buffer read control unit 15 to adjust the transmission rate. NULL packet insertion unit 24 inserts NULL packets that have been generated by NULL packet generation unit 23 between TS packets that have been read by buffer read control unit 15 in accordance with the insertion signal that is supplied as output from NULL packet insertion control unit 22. Packet transmission unit 25 sends packets in which NULL packets have been inserted by NULL packet insertion unit 24 to MPEG decoder 3 at TS clock as 8-bit TS data.

In transmission rate adjustment device 2 of the present embodiment, buffer read unit 7 adjusts the transmission rate by inserting NULL packets into MPEG2-TS and rewriting the PCR based on appended information that has been acquired by buffer write unit 5.

Figure 5:
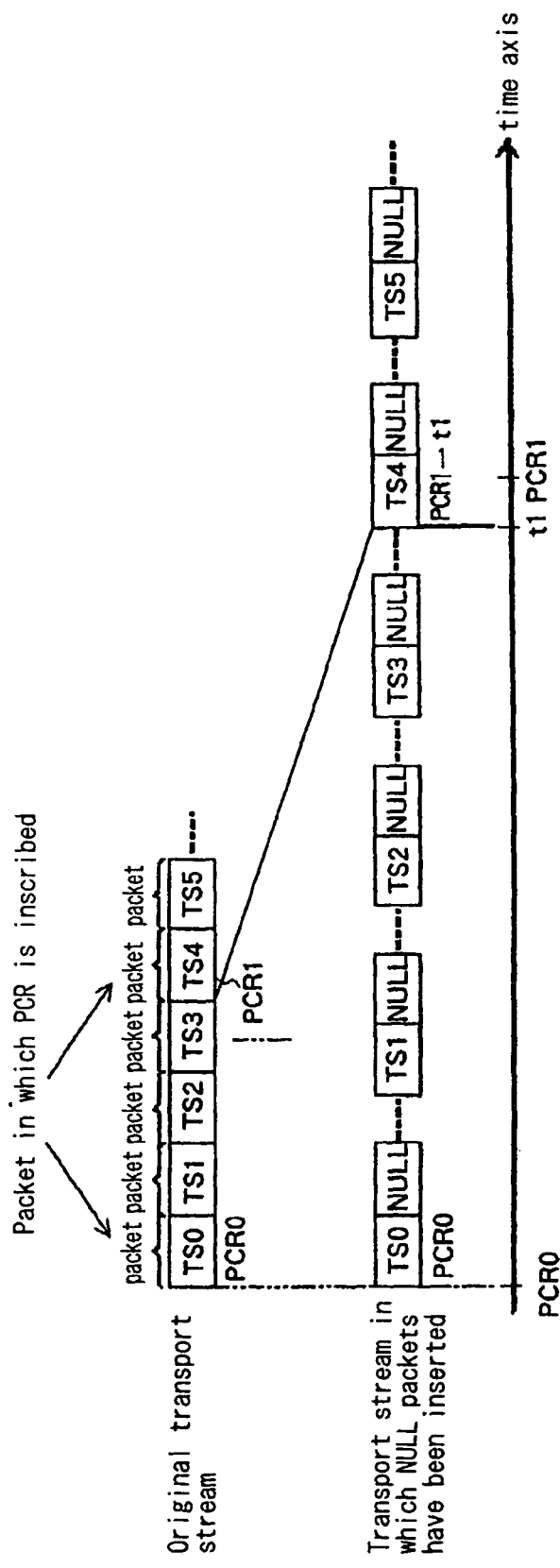
FIG. 5 is a view for explaining the adjustment of transmission rate in the transmission rate adjustment device shown in FIG. 3.

FIG. 5 is a view for explaining the adjustment of the transmission rate. The original transport stream is the MPEG2-TS that has been read from MPEG2-TS file 1 and includes a plurality of TS packets TS0, TS1, TS2, TS3, TS4, TS5, . . . PCR0 is inscribed in the adaptation field of TS packet TS0. PCR1 is inscribed in the adaptation field of TS packet TS4. PCR0 and PCR1 in this original transport stream are time interval information that is used to reproduce the standard time interval used at the time of encoding in the STC of MPEG decoder 3, and PCR0 and PCR1 have no relation to the time interval on the time axis in FIG. 5.

In the transport stream in which NULL packets have been inserted shown in FIG. 5, NULL packets are inserted between each packet of the original transport stream by NULL packet insertion unit 24. In FIG. 5, the transport stream in which NULL packets have been inserted is depicted on a time axis at the time of sending to MPEG decoder 3 at the transmission rate of the interface.

In NULL packet insertion unit 24, NULL packets are inserted between TS packets such that PCR0 and PCR1 that are inscribed in packets TS0 and TS4, respectively, of the original transport stream match with PCR0 and PCR1 on the time axis. However, when the transmission rate calculated at transmission rate calculation unit 17 is not an integer multiple of the transmission rate of MPEG2-TS that is read from MPEG2-TS file 1, the position of this t1 will not match the original position of PCR1 on the time axis if the position on the time axis of PCR1 that is inscribed at packet TS4 of the transport stream in which NULL packets have been inserted is made t1 as shown in FIG. 5. If the transport stream in which the position of t1 does not match with the original position of PCR1 on the time axis is transmitted without alteration to MPEG decoder 3 as TS data 8, the system clock cannot be accurately reproduced in MPEG decoder 3, and the STC count will therefore be inaccurate.

When the transmission rate cannot be adjusted by merely inserting NULL packets as described above, a PCR compensation amount is calculated based on the remainder (fraction) produced when dividing the difference value of PCR0 and PCR1 by the sum of the packet time length of the TS packets and NULL packets that are between these PCR0 and PCR1 such that PCR1 that is inscribed in packet TS4 matches position t1 on the time axis, and the value of PCR1 is rewritten based on the PCR compensation amount that has been calculated. In this way, the transmission rate of MPEG2-TS that has been read from MPEG2-TS file 1 can be made to agree with the transmission rate calculated in transmission rate calculation unit 17.

An actual example of the calculation of PCR compensation is shown below it is first assumed that the value of PCR0 is "0," the value of PCR1 is "20," the TS packet time length (which is equal to the NULL packet time length) is "3," and the number of TS packets between PCR0 and PCR1 in the original transport stream is "4." In this case, the total TS packet time length is 12(=3×4). Under these circumstances, when MPEG2-TS in which NULL packets have been inserted is supplied to MPEG decoder 3, the time position of PCR 1 is "12," which does not agree with "20," the inscribed time interval.

The insufficient time interval is corrected by inserting NULL packets. The insufficient time interval is the value "8" obtained by subtracting "12," the total time length of TS packets, from "20," which is the inscribed time; and two NULL packets can be inserted in the portion of this insufficient time interval. In this case, the total time length of two NULL packets is "6," whereby a time interval "6" of the portion of the insufficient time interval "8" is compensated by two NULL packets. However, the remaining time interval "2" cannot be compensated by a NULL packet having a packet time length of "3."

Regarding the position in time of PCR1 in the transport stream in which two NULL packets have been inserted, the addition of the time length "6" of two NULL packets to the total TS packet time length "12" produces "18," and this "18" does not agree with the inscribed time "20." The position in time "18" of PCR1 at this time is the position of t1 on the time axis shown in FIG. 5. In the present embodiment, the value of PCR1 of a transport stream in which NULL packets have been inserted is rewritten from the original position of PCR1 "20" on the time axis to the position of t1 "18".

Figure 6:
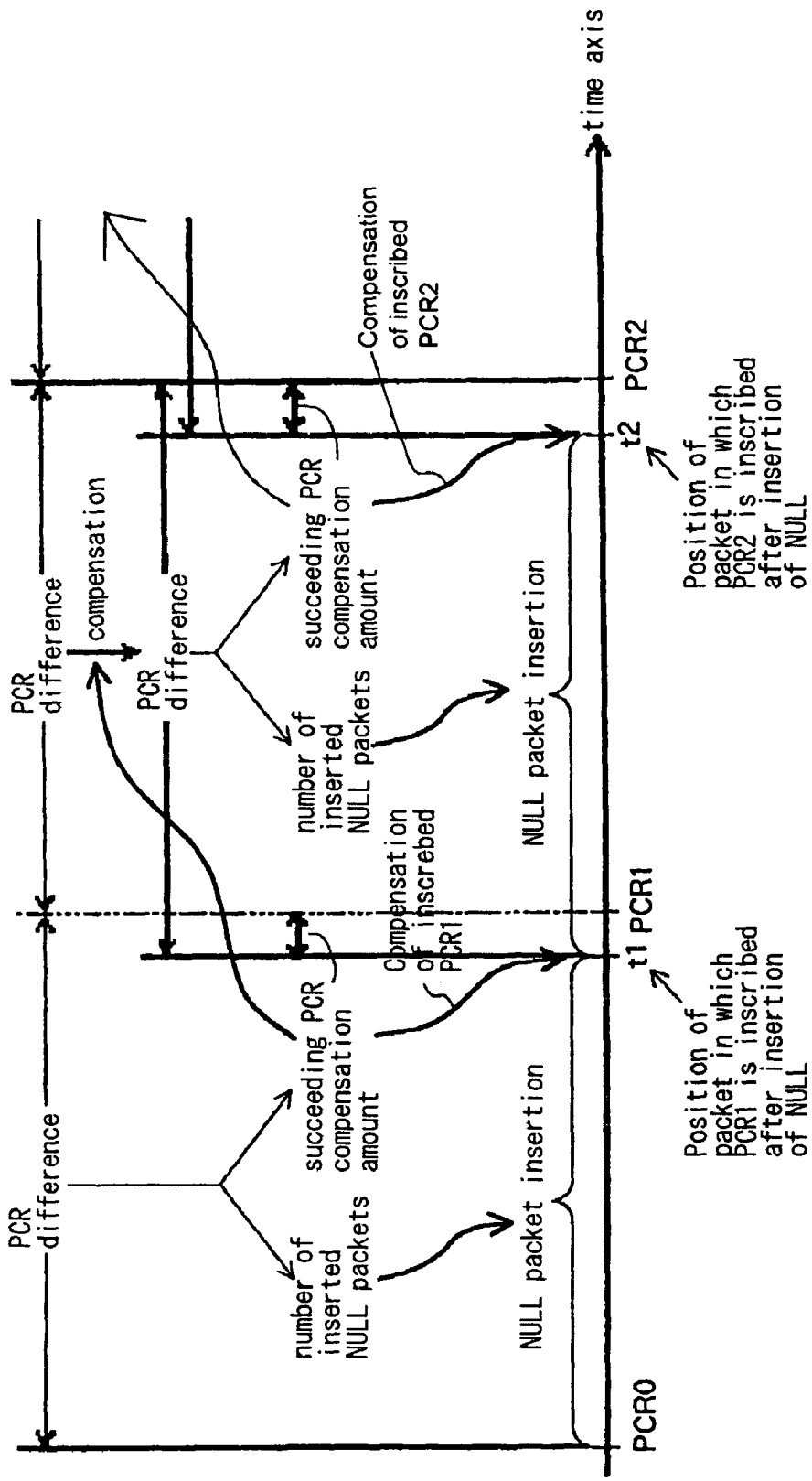
FIG. 6 is a view for explaining PCR compensation in the transmission rate adjustment device shown in FIG. 3.

FIG. 6 gives a schematic representation of the progress of the series of processes for PCR compensation that are carried out in buffer read unit 7. Referring to FIG. 6, the number of NULL packets to be inserted and the PCR compensation amount when rewriting the next PCR1 for adjusting the fraction are first calculated in buffer read unit 7 based on the PCR difference and the number of packets between PCR that have been read as the appended information of PCR0. The value of the next PCR1 is then rewritten based on the calculated PCR compensation amount. The same calculation is carried out for appended information following PCR1, and the value of the next PCR is rewritten.

Explanation next regards the operation of transmission rate adjustment device 2 of the present embodiment.

Explanation first regards the operation of buffer write unit 5. In buffer write unit 5, buffer write control unit 13 successively writes transport packets that have been read from MPEG2-TS file I to buffer 6 as long as there is vacancy, and PCR detection unit 10 simultaneously detects and acquires the PCR that are inscribed in the adaptation field in the transport stream.

When the first PCR is detected by PCR detection unit 10, inter-PCR packet measurement unit 9 is reset at the timing of this detection and the first PCR detected by PCR detection unit 10 is stored in preceding PCR storage unit 11. Inter-PCR packet number measurement unit 9 that has been reset measures the number of packets from the packet in which the PCR is inscribed to the packet preceding the packet in which the next PCR is inscribed as the number of packets between PCR.

When the second PCR is detected by PCR detection unit 10, PCR difference calculation unit 12 calculates the PCR difference from this second PCR that has been detected by PCR detection unit 10 and the preceding PCR that is stored in preceding PCR storage unit 11. Buffer write control unit 13 then writes the PCR difference calculated by PCR difference calculation unit 12, the number of packets between PCR measured by inter-PCR packet number measurement unit 9, and the PCR that is stored in preceding PCR storage unit 11 to buffer 6 as the appended information of the packet in which the first PCR was inscribed.

For the third and succeeding PCR, the same operations as described above for the detection of the second PCR are repeated each time a PCR is detected by PCR detection unit 10. In this way, TS packets that have been read from MPEG2-TS file 1 are sequentially stored in buffer 6, and the appended information, which includes: the number of packets between PCR, i.e., the number of packets from the current PCR to the next PCR; the PCR difference, i.e., the difference between the current PCR and next PCR; and the value of the current PCR, are added to the TS packets in which PCR are inscribed.

Explanation next regards the operation of buffer read unit 7.

When the second PCR is detected and the appended information (number of packets between PCR, PCR difference, and PCR value) are added to the packet in which the first PCR is inscribed and which is stored in buffer 6 by buffer write control unit 5, buffer read control unit 15 begins reading packets from buffer 6.

In the initial state, "0" is stored as the compensation amount in PCR compensation amount storage unit 19. As a result, compensation by PCR compensation unit 20 and PCR difference calculation unit 16 is not carried out for the PCR value and the PCR difference of the appended information that is read from buffer 6 together with the packet in which the first PCR is inscribed. In addition, PCR rewrite unit 21 rewrites the PCR of the packet in which the first PCR is inscribed to the same value as that PCR and supplies this value to NULL packet insertion unit 24.

Before the packet in which the next PCR is inscribed is read from buffer 6 by buffer read control unit 15, inserted NULL packet number/succeeding PCR compensation amount calculation unit 18 calculates the number of inserted NULL packets that should be inserted, and further, calculates the succeeding PCR compensation amount for compensating the value of the succeeding PCR to compensate the fractional amount that cannot be adjusted by NULL packets. This succeeding PCR compensation amount is stored in PCR compensation amount storage unit 19.

After calculating the succeeding PCR compensation amount, NULL packet insertion control unit 22 determines the positions of insertion of NULL packets based on the number of inserted NULL packets and the number of packets between PCR, and NULL packet insertion unit 24 inserts NULL packets that have been generated by NULL packet generation unit 23 between packets that are supplied from PCR rewrite unit 21. The transport stream in which NULL packets have been inserted is supplied as 8-bit TS data from packet transmission unit 25 to MPEG decoder 3 at the TS clock that is supplied from clock frequency division unit 14.

When packets in which the second and succeeding PCR have been inscribed are read from buffer 6, based on the succeeding PCR compensation amount that is stored in PCR compensation amount storage unit 19, PCR compensation unit 20 compensates the value of the PCR that has been read as appended information and PCR difference compensation unit 16 compensates the PCR difference that has been read as appended information. PCR rewrite unit 21 then rewrites the value of the PCR of packets in which PCR have been inscribed and which have been read from buffer 6 to the PCR value that has been compensated by PCR compensation unit 20 and supplies the result to NULL packet insertion unit 24.

TS packets in which PCR have been rewritten to compensated PCR by PCR rewrite unit 21 are sent to NULL packet insertion unit 24. Inserted NULL packet number/succeeding PCR compensation amount calculation unit 18 calculates the number of inserted NULL packets that should be inserted and the succeeding PCR compensation amount for compensating the fractional amount that cannot be adjusted by NULL packets until the next PCR-inscribed packet is read from buffer 6. Subsequently, NULL packet insertion control unit 22 determines the insertion positions from the number of inserted NULL packets and the number of packets between PCR, and NULL packet insertion unit 24 inserts NULL packets that have been generated by NULL packet generation unit 23 between packets that are supplied from PCR rewrite unit 21. The transport stream in which NULL packets have been inserted is then supplied from packet transmission unit 25 as 8-bit TS data to MPEG decoder 3 at TS clock that is supplied from clock frequency division unit 14.

According to the transmission rate adjustment device of the present embodiment described in the foregoing explanation, by using TS clock obtained by frequency-dividing the system clock of MPEG decoder 3 as the interface clock with MPEG decoder 3, by inserting NULL packets between packets of MPEG2-TS to adjust the transmission rate that is calculated from the number of bytes between PCR that are inscribed within MPEG2-TS such that the transmission rate matches the interface transmission rate that is determined by the interface clock, and further, by rewriting PCR values for the fractional amount for which adjustment cannot be achieved by merely inserting NULL packets, MPEG2-TS that has been read from MPEG2-TS file 1 can be transmitted to MPEG decoder 3 at the correct transmission rate without having to reproduce a clock by means of a PLL circuit.

In addition, the uniform insertion of NULL packets between packets of MPEG2-TS enables a suppression of overflow of the buffer in MPEG decoder 3. A more specific explanation of the reasons for these effects follows below.

Figure 7:
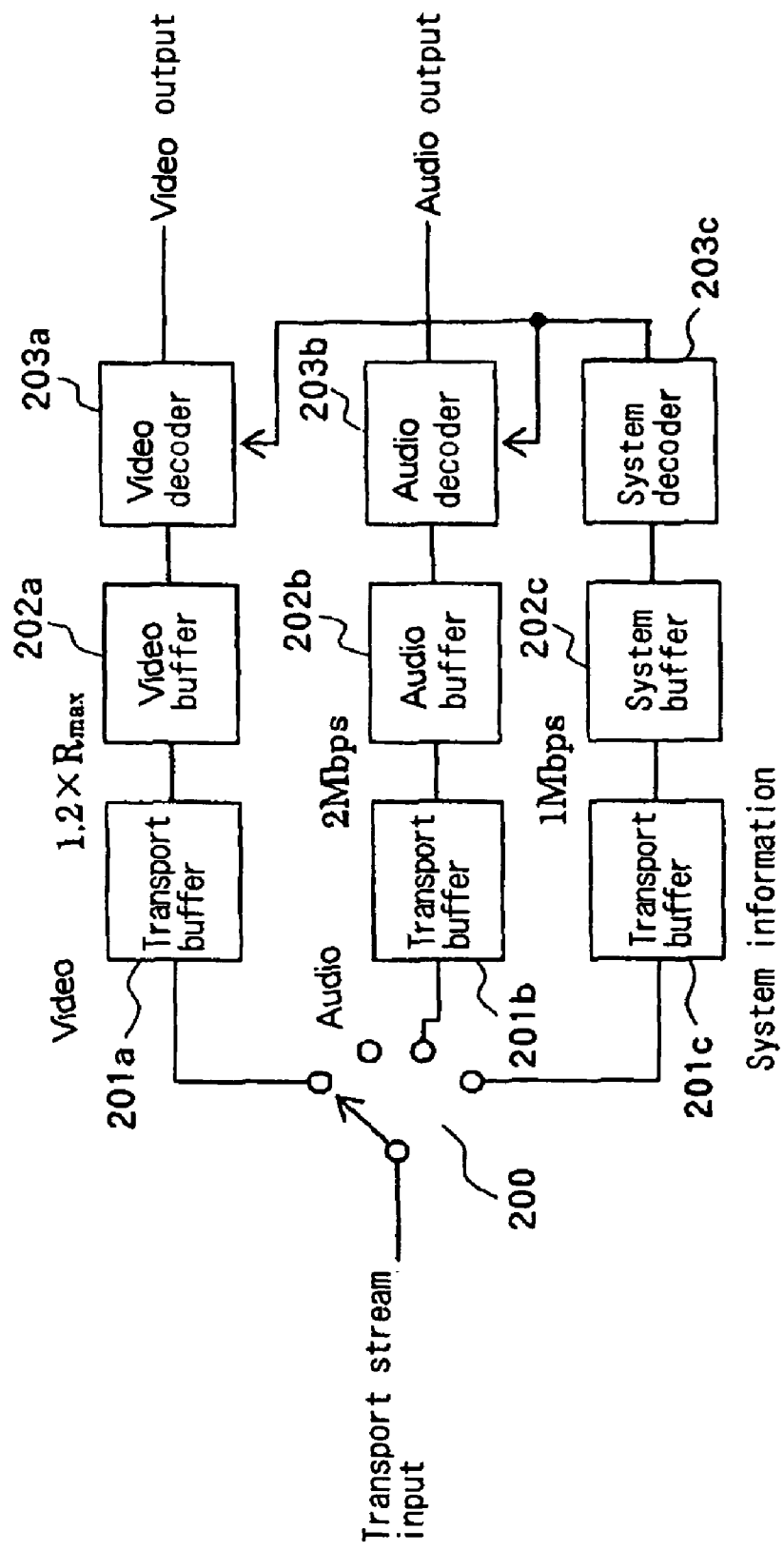
FIG. 7 is a block diagram showing the schematic configuration of an MPEG decoder.

FIG. 7 shows the schematic configuration of an MPEG decoder. Referring to FIG. 7, this MPEG decoder includes: switch unit 200, transport buffers 201a-210c, video buffer 202a, audio buffer 202b, system buffer 202c, video decoder 203a, audio decoder 203b, and system decoder 203c. The capacity of each of transport buffers 201a-210c is 512 bytes.

Switch unit 200 takes as input a transport stream that is supplied as TS data from transmission rate adjustment device 2 shown in FIG. 3, and based on PID (Packet Identification information) in the headers of the packets, separates the transport stream that has been received as input to transport packets of video data, audio data, and system information. In addition, based on the PID (Packet Identification information), switch unit 200 determines the NULL packets in the transport stream input and discards the NULL packets.

The transport packets of the video data that have been separated by switch unit 200 are stored in video buffer 202a by way of transport buffer 201a and then decoded by means of video decoder 203a. Here, the speed of reading data from transport buffer 201a to video buffer 202a is given as 1.2× Rmax. Rmax is the upper limit of the bit rate that is determined by the MPEG profile and level. In the case of main profile/main level, the data read speed is 15 Mbps.

The transport packets of audio data that have been separated by switch unit 200 are stored in audio buffer 202b by way of transport buffer 201b and then decoded by audio decoder 203b. Here, the read speed of data from transport buffer 201b to audio buffer 202b is 2 Mbps.

Transport packets of system information that have been separated by switch unit 200 are stored in system buffer 202c by way of transport buffer 201c and then decoded by system decoder 203c. Here, the read speed of data from transport buffer 201c to system buffer 202c is 1 Mbps.

In the MPEG decoder of the above-described configuration, when the bit rate of data that are applied as input to the transport buffer exceeds the read rate of the transport buffer, overflow may occur in the transport buffer.

The bit rate of data that are applied as input to the transport buffer changes according to the method of inserting NULL packets in transmission rate adjustment device 2. For example, if NULL packets are inserted as a group after the final TS packet between PCR in transmission rate adjustment device 2, the NULL packets are transmitted after transmitting all of the TS packets. The transmission rate of TS packets in this case is the transmission rate of the transport stream after adjustment (the transmission rate of the transport stream that is supplied as output from packet transmission unit 25 shown in FIG. 3). Alternatively, if NULL packets are inserted between the TS packets between PCR, the NULL packets are transmitted alternately with TS packets. The transmission rate of TS packets in this case is lower than the transmission rate of the transport stream after adjustment. When the number of NULL packets inserted between each TS packet varies, the transmission rate of TS packets in portions having few inserted NULL packets is higher than the transmission rate in portions having many inserted NULL packets. As a result, portions in which the bit rate is rapid and portions in which the bit rate is slow occur in the bit rate of video and audio streams.

In the configuration shown in FIG. 3, when a large difference occurs between the transmission rate of MPEG2-TS that is read from MPEG2-TS file 1 and the transmission rate following adjustment (the transmission rate of the transport stream that is supplied as output from packet transmission unit 25 shown in FIG. 3), the bit rate of data that are applied as input to the transport buffer may surpass the rate of reading the transport buffer in cases in which NULL packets are inserted as a group at the end of TS packets between PCR and cases in which the number of NULL packets inserted between each TS packet varies. The uniform insertion of NULL packets between each TS packet can solve this problem.

The following explanation regards a method for uniform insertion of NULL packets between each TS packet that is implemented in the transmission rate adjustment device of the present embodiment.

First NULL Packet Insertion Method

The interface to MPEG decoder 3 is 8 bits and has a clock that is obtained by frequency-dividing the system clock of MPEG decoder 3 (27 MHz), and the transmission rate of the transport stream (TS data) that is supplied as output from packet transmission unit 25 is therefore represented as "27 MHz/frequency division rate×8 bits" and assumes the values shown in FIG. 8 according to the frequency division rate. For example, when the frequency division rate is "1," the transmission rate is "216 Mbps."

Inserted NULL packet number/succeeding PCR compensation amount calculation unit 18 calculates the number of TS packets between PCR after adjustment based on the time difference between PCR (PCR difference) and the transmission rate after adjustment that has been calculated by transmission rate calculation unit 17 and from these calculation results then calculates the number of NULL packets that should be inserted. The number of TS packets between PCR after adjustment is given by [time difference between PCR/(188/transmission rate after adjustment)]. The number of NULL packets that should be inserted is given by [(number of TS packets between PCR)−(time difference between PCR/(188/transmission rate after conversion))].

NULL packet insertion control unit 22 next controls the insertion of NULL packets in NULL packet insertion unit 24 as described below. The quotient of [number of NULL packets/number of TS packets] is first found based on the number of TS packets between PCR and the number of NULL packets inserted between PCR. NULL packets in a number that corresponds to the quotient that has been found are then inserted for each TS packet. NULL packets of a number that corresponds to the remainder of [number of NULL packets/number of TS packets] are then uniformly inserted for [TS packets+NULL packets inserted for each TS packet].

Figure 9:
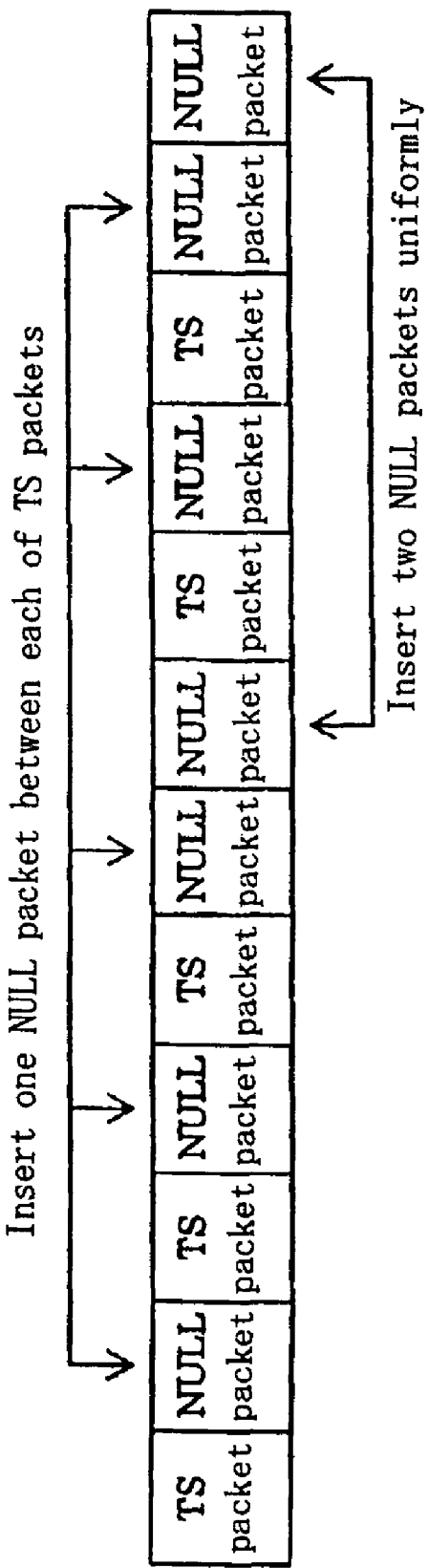
FIG. 9 is a schematic view showing an example of the transport stream in which NULL packets are uniformly inserted.

More specifically, when seven NULL packets are inserted for five TS packets, the number of NULL packets that are inserted for each TS packet is the quotient of [number of NULL packets/number of TS packets], i.e., the quotient of "7/5" (=1). The remaining NULL packets that should be inserted uniformly is the remainder of [number of NULL packets/number of TS packets], i.e., "7/5" (=2). In this case, one NULL packet is inserted between each of the first to fifth TS packets that exist between PCR as shown in FIG. 9 in accordance with a NULL packet insertion process based on the quotient of "7/5," and one NULL packet is further inserted between the third and fourth TS packets and at the end of the PCR interval in accordance with a NULL packet insertion process based on the remainder of "7/5."

Due to the relation between the transmission rates before and after adjustment, overflows in the transport buffer can be suppressed by using only the average insertion of NULL packets per TS packet based on the quotient of [number of NULL packets/number of TS packets] even if the insertion of NULL packets based on the remainder of [number of NULL packets/number of TS packets] is not carried out by averages.

Second NULL Packet Insertion Method

Inserted NULL packet number/succeeding PCR compensation amount calculation unit 18 may also find an average insertion spacing of NULL packets, and NULL packet insertion control unit 22 may control the insertion of NULL packets in NULL packet insertion unit 24 based on this average insertion spacing of NULL packets. When the average insertion spacing of NULL packets is given by, for example, [TS packets/{remainder of (number of NULL packets/number of TS packets)}], the value of the average insertion spacing is normally a decimal. NULL packets are inserted for [(TS packets)÷(NULL packets inserted per TS packet)] with, of values of the average insertion spacing (a decimal), the value of the integer portion (the first insertion spacing) and a value obtained by adding "1" to this value (second insertion spacing) as the insertion spacing. In other words, if the insertion spacing is "2," one NULL packet is inserted for two [(TS packets)÷(NULL packets inserted per TS packet)].

More specifically, the insertion of NULL packets is carried out by the procedure described below.

(1) First, of the first and second insertion spacings, the larger insertion spacing is used, whereby one NULL packet is inserted for a number of TS packets equal to the value of this insertion spacing.

(2) The average insertion spacing to this point is found. This is the first insertion, so the average insertion spacing is [(insertion spacing of (1))/1].

(3) If the average insertion spacing of the previous case found in (2) is greater than the average insertion spacing of the preceding NULL packets, the insertion spacing is set to the smaller of the first and second average insertion spacings. If the average insertion spacing of the previous case is less than or equal to the average insertion spacing of the NULL packets, the insertion spacing is set to the larger of the first and second insertion spacings.

(4) One NULL packet is inserted in a number of TS packets that is equal to the number of insertion spacings determined in (3).

(5) The average insertion spacing to this point is found. The process then returns to (3) and the insertion of NULL packets is repeated until the remainder of [number of NULL packets/number of TS packets].

Explanation next regards a specific example of the above-described process.

For example, in a case in which seven NULL packets are to be inserted into ten TS packets, the average insertion spacing of the NULL packets is "10/7=1.429." The insertion spacings in this case are the whole number portion of the first insertion spacing "1," and the second insertion spacing "2" in which "1" is added to the first insertion spacing.

In the above-described step (1), the insertion spacing is first taken as the larger second insertion spacing "2," and one NULL packet is inserted into two TS packets. In the above-described step (2), the average insertion spacing to this point is found. In this case, the average insertion spacing is "2/1=2.000."

Next, in the step of the above-described (3), the previous average insertion spacing "2.000" is greater than the average insertion spacing of NULL packets "1.429," and the insertion spacing is therefore taken as the smaller first insertion spacing "1." In the step of the above-described (4), one NULL packet is inserted into one TS packet.

In the step of the above-described (5), the average insertion spacing to this point is found. The average insertion spacing in this case is "3/2=1.5." In the above-described step (3), the previous average insertion spacing "1.5" is greater than the average insertion spacing of NULL packets "1.429," and the insertion spacing is therefore set to the smaller first insertion spacing "1." In the above-described step (4), one NULL packet is inserted into one TS packet.

In the above-described step (5), the average insertion spacing to this point is next found. The average insertion spacing in this case is "3/2=1.333." Since the previous average insertion spacing "1.333" in the above-described step (3) is smaller than the average insertion spacing of NULL packets "1.429," the insertion spacing is next set to the larger first insertion spacing "2." One NULL packet is next inserted into two TS packets in the above-described step (4).

Next, in the above-described step (5), the average insertion spacing to this point is found. The average insertion spacing in this case is "3/2=1.500." The insertion of NULL packets is subsequently carried out in the same way.

FIG. 10 shows the changes in the values of the number of TS packets that are the object of insertion of NULL packets, the number of inserted NULL packets, the total TS packets, the total NULL packets, and the average insertion spacing according to the above-described procedure. As can be seen from this FIG. 10, one NULL packet is inserted for two TS packets at the beginning. The total TS packets at this time is "2," the total NULL packets is "1," and the average insertion spacing is "2.00." One NULL packet is next inserted into one TS packet. At this time, the total TS packets is "3," the total NULL packets is "2," and the average insertion spacing is "1.5." This series of processes is repeated.

Explanation next regards an example of the insertion of NULL packets in the second NULL packet insertion method.

The frequency division rate given by frequency division rate input signal 26 is assumed to be "8," and the transmission rate of TS data that packet transmission unit 25 sends to MPEG decoder 3 is assumed to be 27 Mbps.

In a case in which the profile of MPEG2-TS file 1 is assumed to be the main and the level is assumed to be the main, the upper limit of the bit rate of video data that are applied as input to transport buffer 201a shown in FIG. 7 is 15 Mbps. The read rate of video data from transport buffer 201a is 18 Mbps (=1.2×15 Mbps).

The MPEG2-TS that is read from MPEG2-TS file 1 contains one video stream and one audio stream. The bit rate of the video stream is 14 Mbps, and the bit rate of the audio stream is 448 kbps. The transmission rate of the MPEG2-TS that is read is 15 Mbps. The time difference between PCR of MPEG2-TS that is read is 90.24 ms, and the number of packets between PCR is 900.

The time length of TS packets after adjustment is "188/27 Mbps=55.704 µs." The number of packets between PCR after adjustment is [PCR difference/(time length of TS packets after conversion)=90.24 ms/55.704 µs=1620.] Accordingly, the number of packets to be inserted is "1620−900=720." In this case, 720 NULL packets are inserted into 900 TS packets between PCR.

A case is first considered in which 720 NULL packets are inserted as a group after the 900 TS packets. In this case, the bit rate of the video stream becomes:

15 Mbps×27 Mbps/15 Mbps=25.2 Mbps and the bit rate of the audio stream becomes:

448 kbps×27 Mbps/15 Mbps=806.4 kbps

The video stream exceeds the bit rate of 18 Mbps at which the transport stream is read, and transport buffer 201a of the video therefore fails.

A case is next considered in which NULL packets are uniformly inserted between TS packets.

The number of NULL packets that are to be inserted for each TS packet that is based on the number of TS packets between PCR and the number of NULL packets that are to be inserted between PCR is the quotient of [number of NULL packets/number of TS packets], i.e., the quotient of "720/900=0." Accordingly, NULL packets are to be uniformly inserted according to the remainder (=720) of [number of NULL packets/number of TS packets].

The ratio of the number of TS packets to the number of NULL packets is "900:720=5:4," and as a result, four NULL packets are to be inserted for each five TS packets. The average insertion spacing of NULL packets in this case is "900/720=1.25," the spacing of insertion is therefore "1", which is the whole number portion of this average insertion spacing, and "2", which is obtained by adding "1" to this "1." Thus, according to the second NULL packet insertion method, one NULL packet is inserted for two TS packets, or one NULL packet is inserted for one TS packet.

FIG. 11 shows the changes in the values of the number of TS packets that are the object of NULL packet insertion, the number of NULL packets that are inserted, the total TS packets, the total NULL packets, and the average insertion spacing according to the above-described procedure. As can be understood from this FIG. 11, one NULL packet is inserted for two TS packets. The total TS packets at this time is "2," the total NULL packets is "1," and the average insertion spacing is "2.00." Next, one NULL packet is inserted for one TS packet. At this time, the total TS packets is "3," the total NULL packets is "2," and the average insertion spacing is "1.5." This series of processes is repeated such that NULL packets are substantially uniformly inserted between each of the TS packets.

In the above-described case, the read rate of transport buffer 201a of videos is 18 Mbps (=1.2×15 Mbps) and the transmission rate is 27 Mbps, whereby the amount of data that are read from transport buffer 201a during the interval in which one TS packet (188 bytes) is applied as input to transport buffer 201a is "18 Mbps/27 Mbps×188 bytes=125.3 bytes."

Figure 13:
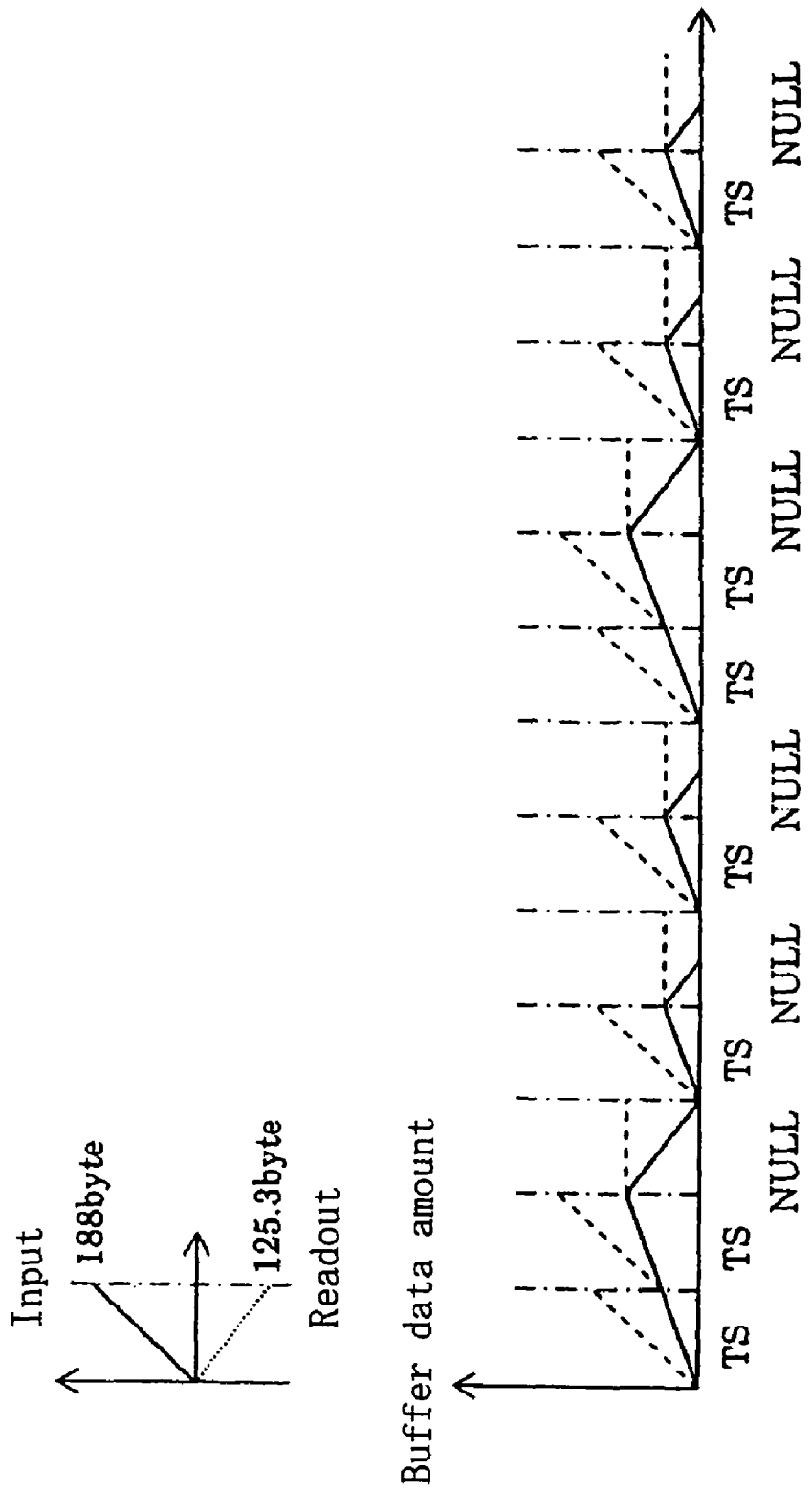
FIG. 13 shows the transition in the data values that are stored in a transport buffer in the case of uniform insertion of NULL packets.

FIG. 12 shows the changes in the amount of data that are stored in transport buffer 201a when the insertion of NULL packets is substantially uniform as described above, and FIG. 13 shows the transition of the amount of data in transport buffer 201a. As can be seen from FIG. 12 and FIG. 13, the amount of data stored in transport buffer 201a does not surpass 512 bytes, which is the buffer capacity, and transport buffer 201a of videos therefore does not fail.

In the foregoing explanation, explanation regarded the reasons that the failure of buffer is suppressed taking video transport buffer 201a as an example, but the present invention can also suppress buffer failure for the audio transport buffer.

The difference between the number of NULL packets inserted between each of the packets of transport packets read from a buffer is preferably within the limit of one. Limiting the difference in the number of NULL packets to within one enables the reliable limitation of the transport buffer.

As can be understood from the foregoing explanation, the transmission rate adjustment device of the present embodiment can suppress the failure of the transport buffer in MPEG decoder 3 by implementing uniform insertion of NULL packets between transport packets that are read from a buffer.

In contrast, in the device disclosed in the previously described Patent Document 1, the difference in transmission rate before and after adjustment is not great, and as a result, the read rate of the video transport buffer is 1.2 times the upper limit of the stream bit rate and the read rate of the audio transport buffer is 4 times or more than the upper limit of the bit rate of the stream (2 Mbps/448 kbps) even when NULL packets are inserted as a group at the end of an interval between PCR. Thus, in a case in which, for example, a transmission rate of 25 Mbps is converted to a transmission rate of 27 Mbps, the conversion ratio is 1.08, and the failure of the video and audio transport buffers does not occur. In other words, even when the video stream is at its upper limit and the audio stream is at an upper limit of 448 kbps, the read rate is not exceeded.

In addition, in the device disclosed in Patent Document 1, PCR enter once every 100 ms, meaning that at a transmission rate of 25 Mbps, approximately 1662 bytes (100 ms/(188 bytes/(25 Mbps/8)) of packets enter the transport buffer between PCR. At a transmission rate of 27 Mbps, these packets enter the transport buffer in 92 ms (100 ms/1.08). In other words, at a transmission rate of 25 Mbps, packets enter the transport buffer at approximately 1538 bytes (1662 bytes/10.8) in 92 ms; but packets enter the transport buffer at only approximately 1662 byes at a transmission rate of 27 Mbps, whereby failures of the transport buffer do not occur.

As can be understood from the foregoing explanation, in the device disclosed in Patent Document 1, the difference in transmission rate before and after adjustment is assumed to be not particularly great, and it is therefore difficult to foresee the occurrence of the problem of failure of the transport buffer of the MPEG decoder depending on the method of inserting NULL packets. Accordingly, based on the disclosure of Patent Document 1, it would be difficult to arrive at the technical concept that implementing the uniform insertion of NULL packets can suppress failure of the transport buffer, which is one effect of the present embodiment.

The uniform insertion of NULL packets does not mean that the number of NULL packets that are inserted between TS packets is simply the same between each TS packet. For example, as explained in the first and second NULL packet insertion methods, when NULL packets are inserted by a method in which NULL packets are first inserted one at a time between TS packets, following which the remaining NULL packets are divided and inserted such that the time length is uniform for the TS packets in which NULL packets have been inserted, the number of NULL packets that are inserted between TS packets is not the same between each of the TS packets. As a result, in the present invention, the number of NULL packets between TS packets when NULL packets have been uniformly inserted may be the same or may differ as long as these numbers are within the range that does not cause failure of the transport buffer of the MPEG decoder.

Further, although explanation has regarded a case in which the TS packets and NULL packets are both packets of 188 bytes, the present invention is not limited to this form and packets may be of other fixed lengths (for example, the packets may be of 204 bytes).

While exemplary embodiments of the present invention have been described using specific terms, such description is for illustrates purposes only, and it is to be understood that changes and variations may be made without departing from the spirit or scope of the following claims.

Further, Applicant's intent is to encompass the equivalents of all claim elements, and no amendment to any claim in the present application should be construed as a disclaimer of any interest in or right to an equivalent of any element or feature of the amended claim.

What is claimed is:

1. A transmission rate adjustment device for adjusting a transmission rate of an input transport stream without using a hardware-implemented PLL (phase locked loop) circuit that controls the adjusted transmission rate, the transmission rate adjustment device taking as input a transport stream that comprises a plurality of transport packets having a fixed packet length in which encoded data are stored, and in which time stamps of a prescribed frequency that is a standard time interval during said encoding are inscribed at fixed time intervals, said transmission rate adjustment device comprising:

a buffer;
a buffer write unit that both successively writes transport packets of said input transport stream to said buffer and detects time stamps in said input transport stream; and
a buffer read unit that takes as input both a frequency division rate signal that designates a frequency division rate and system clocks of a decoder for decoding said encoded data, and that transmits to said decoder transport packets that have been sequentially read from said buffer at a transmission rate determined by clocks obtained by frequency-dividing the input system clocks by the frequency division rate designated by the input frequency division rate signal,
wherein:
said buffer write unit, upon detecting said time stamps, stores in said buffer:
  a difference between a first time stamp that has been detected this time and a second time stamp that was previously detected,
  a number of transport packets that exist in an interval between the first and second time stamps, and
  a value of said second time stamp as appended information of the transport packet to which said second time stamp is inscribed; and
said buffer read unit, upon reading from said buffer a transport packet to which said second time stamp has been inscribed, based on said appended information that has been attached to the transport packet, inserts NULL packets between transport packets that have been read from said buffer to achieve adjustment such that said transport packets are transmitted at said transmission rate, and when adjustment cannot be achieved by a mere insertion of NULL packets, when reading from said buffer the transport packet in which said first time stamp has been inscribed, rewrites the time stamp of the transport packet,
said transmission rate adjustment device thereby providing a software-implemented mechanism based on said frequency division rate signal to control the adjusted transmission rate rather than a hardware-implemented PLL (phase locked loop) circuit.

2. A transmission rate adjustment device according to claim 1, wherein said buffer read unit uniformly inserts said NULL packets between transport packets that have been read from said buffer, the uniform insertion of said NULL packets thereby preventing said NULL packets from being inserted as a group.

3. A transmission rate adjustment device according to claim 2, wherein said buffer read unit, based on the difference between said first and second time stamps and a transmission rate determined by clocks obtained by frequency-dividing said input system clocks:
calculates a number of transport packets between said first and second time stamps after transmission rate adjustment, and from results of this calculation, calculates a number of NULL packets that should be inserted; and
when a calculation result of dividing the calculated number of NULL packets by said calculated number of transport packets contains a quotient and a remainder, inserts a number of NULL packets that corresponds to said quotient for each of transport packets that have been read from said buffer and, further, uniformly inserts a number of NULL packets that corresponds to said remainder in a state in which said NULL packets are inserted.

4. A transmission rate adjustment device according to claim 2, wherein said buffer read unit, based on the difference between said first and second time stamps and a transmission rate determined by clocks obtained by frequency-dividing said input system clocks:
calculates a number of transport packets between said first and second time stamps after transmission rate adjustment, and from results of this calculation, calculates a number of NULL packets that should be inserted;
when a standard average insertion spacing obtained by dividing the calculated number of NULL packets that should be inserted by said number of transport packets that exist between said first and second time stamps is a decimal, takes a value of a whole number portion as a first insertion spacing and a value obtained by adding 1 to this value as a second insertion spacing; and
based on a size relation of an average insertion spacing of NULL packets after NULL packets have been inserted and said standard average insertion spacing, selects between said first and second insertion spacing and inserts one NULL packet for each of transport packets of a number of the value of the selected insertion spacing.

5. A transmission rate adjustment device according to claim 2, wherein said difference between a number of NULL packets that are inserted between each packet of transport packets read from said buffer is 1 or less.

6. A transmission rate adjustment method for adjusting a transmission rate of a transport stream comprising a plurality of transport packets of a fixed packet length in which encoded data are stored and in which time stamps of a prescribed frequency which is a standard time interval during said encoding are inscribed at fixed time intervals, said transmission rate adjustment method adjusting said transmission rate with a software-implemented mechanism eqivalent to a hardware-implemented PLL (phase locked loop) circuit, said transmission rate adjustment method comprising:
sequentially writing transport packets of said transport stream to a buffer; and
frequency-dividing system clocks of a decoder for decoding said encoded data by a frequency division rate designated by a frequency division rate signal supplied externally, and transmitting transport packets that have been sequentially read from said buffer to said decoder at a transmission rate determined by the frequency-divided system clocks, said method further comprising:
in writing transport packets to said buffer:
  detecting time stamps in said transport stream; and
  upon detecting said time stamps, storing in said buffer:
    a difference between a first time stamp that is detected this time and a second time stamp that was detected previously,
    a number of transport packets that exist between the first and second time stamps, and
    a value of said second time stamp,
    as appended information of the transport packet in which said second time stamp is inscribed;
in transmitting transport packets to said decoder:
  upon reading from said buffer a transport packet in which said second time stamp is inscribed, based on said appended information that has been attached to the transport packet, inserting NULL packets between transport packets that have been read from said buffer to implement adjustment such that said transport packets are transmitted at said transmission rate; and
  when adjustment cannot be realized by merely inserting said NULL packets, when reading from said buffer a transport packet to which said first time stamp is inscribed, rewriting the time stamp of said transport packet, said transmission rate adjustment method thereby providing a software-implemented mechanism based on said frequency division rate signal for controlling the adjusted transmission rate without using a hardware-implemented PLL (phase locked loop) circuit for said controlling the adjusted transmission rate.

7. A transmission rate adjustment method according to claim 6, wherein, in transmitting transport packets to said decoder, said NULL packets are uniformly inserted between transport packets that are read from said buffer, the uniform insertion of said NULL packets thereby preventing said NULL packets from being inserted as a group.

8. A transmission rate adjustment method according to claim 7, wherein, in the uniform insertion of said NULL packets:

based on the difference between said first and second time stamps and a transmission rate determined by clocks obtained by frequency-dividing said input system clocks, calculating a number of transport packets between said first and second time stamps after adjustment of transmission rate, and from a result of this calculation, calculating a number of NULL packets that should be inserted; and when a calculation result of dividing said calculated number of NULL packets by said calculated number of transport packets includes a quotient and a remainder, inserting a number of NULL packets that corresponds to said quotient for each transport packet that has been read from said buffer, and further, uniformly inserting a number of NULL packets that corresponds to said remainder in a state in which said NULL packets have been inserted.

9. A transmission rate adjustment method according to claim 7, wherein, in said uniform insertion of said NULL packets:

based on the difference between said first and second time stamps and a transmission rate determined by clocks obtained by frequency-dividing said input system clocks, calculating a number of transport packets between said first and second time stamps after adjustment of transmission rate, and from a result of this calculation, calculating a number of NULL packets that should be inserted; and when a standard average insertion spacing obtained by dividing said calculated number of NULL packets that should be inserted by a number of transport packets that exist between said first and second time stamps is a decimal, taking a value of a whole number portion of this decimal as a first insertion spacing and a value obtained by adding 1 to this value as a second insertion spacing, selecting between said first and second insertion spacing, based on a size relation between the average insertion spacing of NULL packets after NULL packets have been inserted and said standard average insertion spacing, and inserting one NULL packet for transport packets of the number of the value of the selected insertion spacing.

10. A transmission rate adjustment method according to claim 7, wherein the difference between the number of NULL packets that are inserted between each packet of the transport packets that have been read from said buffer is 1 or less.

11. A transmission rate adjustment device for adjusting a transmission rate of an input transport stream without using a hardware-implemented PLL (phase locked loop) circuit to control the adjusted rate, the transmission rate adjustment device taking as input a transport stream that comprises a plurality of transport packets having a fixed packet length in which encoded data are stored, and in which time stamps of a prescribed frequency that is a standard time spacing during said encoding are inscribed at fixed time intervals, said transmission rate adjustment device comprising:

a buffer;

a buffer write means for both successively writing transport packets of said input transport stream to said buffer and detecting time stamps in said input transport stream; and a buffer read means for taking as input both a frequency division rate signal that designates a frequency division rate and system clocks of a decoder for decoding said encoded data, and for transmitting to said decoder transport packets that have been sequentially read from said buffer at a transmission rate determined by clocks obtained by frequency-dividing input system clocks by a frequency division rate designated by an input frequency division rate signal, wherein:

said buffer write means, upon detecting said time stamps, stores in said buffer:
a difference between a first time stamp that has been detected this time and a second time stamp that was previously detected,
a number of transport packets that exist in an interval between the first and second time stamps, and
a value of said second time stamp,
as appended information of the transport packet to which said second time stamp is inscribed; and said buffer read means, upon reading from said buffer a transport packet to which said second time stamp has been inscribed, based on said appended information that has been attached to the transport packet, inserts NULL packets between transport packets that have been read from said buffer to achieve an adjustment such that said transport packets are transmitted at said transmission rate, and when adjustment cannot be achieved by a mere insertion of NULL packets, when reading from said buffer the transport packet in which said first time stamp has been inscribed, rewrites the time stamp of the transport packet, said buffer read means thereby providing a software-implemented timing mechanism to control the adjusted transmission rate without using a hardware-implemented PLL circuit for said controlling said adjusted transmission rate.

12. A transmission rate adjustment method for adjusting a transmission rate of a transport stream composed of a plurality of transport packets of a fixed packet length in which encoded data are stored and in which time stamps of a prescribed frequency which is a standard time interval during said encoding are inscribed at a fixed time intervals, said transmission rate adjustment method using a software-implemented equivalent of a hardware-implement PLL (phase locked loop) to control the adjusted transmission rate, said transmission rate adjustment method comprising:

a first step of sequentially writing transport packets of said transport stream to a buffer; and a second step of frequency-dividing system clocks of a decoder for decoding said encoded data by a frequency division rate designated by a frequency division rate signal supplied externally, and transmitting transport packets that have been sequentially read from said buffer to said decoder at a transmission rate determined by the frequency-divided clocks, wherein said first step comprises steps of:
  detecting time stamps in said input transport stream; and
  upon detecting said time stamps, storing in said buffer:
    a difference between a first time stamp that is detected this time and a second time stamp that was detected previously,
    a number of transport packets that exist between the first and second time stamps, and
    a value of said second time stamp,
    as appended information of the transport packet in which said second time stamp is inscribed; and
said second step comprises steps of
  upon reading from said buffer a transport packet in which said second time stamp is inscribed, based on said appended information that has been attached to the transport packet, inserting NULL packets between transport packets that have been read from said buffer to implement an adjustment such that said transport packets are transmitted at said transmission rate; and
  when adjustment cannot be realized by merely inserting said NULL packets when reading from said buffer a transport packet to which said first time stamp is inscribed, rewriting the time stamp of said transport packet,
  said second step of frequency-dividing system clocks by said externally-supplied frequency division rate thereby providing a software-implemented equivalent of a hardware-implement PLL circuit.

13. The transmission rate adjustment device of claim 1, wherein said transport stream comprises data in a MPEG2-TS format.

* * * * *